United States Patent
Lutz et al.

(10) Patent No.: US 7,974,386 B2
(45) Date of Patent: Jul. 5, 2011

(54) METHODS AND SYSTEMS FOR TESTING NEW NETWORK ELEMENT FAILURE RATE

(75) Inventors: Charles Craig Lutz, Flowery Branch, GA (US); Jason Curtis Spielvogel, Bethlehem, GA (US); Gregory Adams Irwin, Duluth, GA (US); Calvin Laurance, Pell City, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1357 days.

(21) Appl. No.: 11/496,155

(22) Filed: Jul. 31, 2006
(Under 37 CFR 1.47)

(65) Prior Publication Data
US 2008/0263397 A1 Oct. 23, 2008

(51) Int. Cl.
*H04M 1/24* (2006.01)
*H04M 3/08* (2006.01)
*H04M 3/22* (2006.01)

(52) U.S. Cl. .............. 379/15.01; 379/1.01; 379/9.01; 379/9.03; 379/9.04; 379/10.01

(58) Field of Classification Search .......... 379/1.01, 379/9, 9.02, 9.03, 9.04, 10.01, 10.03, 15.01, 379/15.04, 27.01, 29.01, 29.08, 32.01, 9.01
See application file for complete search history.

(56) References Cited

U.S. PATENT DOCUMENTS

| | | | | |
|---|---|---|---|---|
| 4,972,453 A * | 11/1990 | Daniel et al. | ........... | 379/9.03 |
| 5,285,494 A * | 2/1994 | Sprecher et al. | ........... | 455/423 |
| 5,946,372 A * | 8/1999 | Jones et al. | ........... | 379/10.01 |
| 5,953,389 A * | 9/1999 | Pruett et al. | ........... | 379/9 |
| 6,385,298 B1 * | 5/2002 | Beyda et al. | ........... | 379/9 |
| 6,516,055 B1 * | 2/2003 | Bedeski et al. | ........... | 379/32.01 |
| 6,957,257 B1 * | 10/2005 | Buffalo et al. | ........... | 709/224 |
| 7,006,603 B2 * | 2/2006 | Boetje et al. | ........... | 379/9.03 |
| 7,111,318 B2 * | 9/2006 | Vitale et al. | ........... | 725/107 |
| 7,289,605 B1 * | 10/2007 | Jean et al. | ........... | 379/32.01 |
| 7,340,038 B2 * | 3/2008 | Boetje et al. | ........... | 379/9.03 |
| 7,366,731 B2 * | 4/2008 | Lewis et al. | ........... | 1/1 |
| 7,660,394 B1 * | 2/2010 | Blank et al. | ........... | 379/1.01 |
| 2003/0202638 A1 * | 10/2003 | Eringis et al. | ........... | 379/15.01 |
| 2004/0062359 A1 * | 4/2004 | Jones et al. | ........... | 379/1.01 |
| 2004/0254757 A1 * | 12/2004 | Vitale et al. | ........... | 702/122 |
| 2006/0050854 A1 * | 3/2006 | Beamon | ........... | 379/9.02 |
| 2006/0233310 A1 * | 10/2006 | Adams et al. | ........... | 379/2 |
| 2006/0244585 A1 * | 11/2006 | Bishop et al. | ........... | 340/506 |
| 2007/0133755 A1 * | 6/2007 | Jean et al. | ........... | 379/1.01 |
| 2008/0198974 A1 * | 8/2008 | Lewis et al. | ........... | 379/32.04 |
| 2008/0313491 A1 * | 12/2008 | Adams et al. | ........... | 714/4 |

* cited by examiner

*Primary Examiner* — Binh K Tieu
(74) *Attorney, Agent, or Firm* — Hope Baldauff Hartman, LLC

(57) ABSTRACT

Methods, systems, and computer-readable media for testing failure rate of newly installed network elements within a predetermined amount of time prior to customer use of the network elements are provided. An order report including information regarding one or more network elements is accessed, and based on the information provided by the orders report, a network element from the one or more network elements to be tested is determined. Information regarding the network element to be tested is retrieved from the orders report and included on a ticket created for the network element to be tested. The ticket created for the network element is then forwarded to a test device for testing of the network element associated with the forwarded ticket.

12 Claims, 4 Drawing Sheets

METHODS AND SYSTEMS FOR TESTING NEW NETWORK ELEMENT FAILURE RATE

TECHNICAL FIELD

The present invention is related to testing network elements. More particular, the present invention relates to testing failure rate of newly installed and activated network elements within a predetermined amount of time prior to customer use of the network elements.

BACKGROUND

Networking between communication devices has significantly grown over the past decade. A number of network elements, such as circuits, are used in networks to manage and transmit data and/or voice between communication devices. Therefore, the deployment and installation of network elements have also significantly grown over the past decade.

Typically, after a network element, such as a circuit, is installed and activated, no further testing is performed to determine if the circuit is functioning properly. Thus, a failure in the circuit will likely not be detected until a customer tries to utilize services provided by the circuit. Then, if the circuit fails, the customer must contact the circuit supplier to report the circuit failure, causing frustration on the part of the customer and loss of goodwill towards the circuit supplier. Moreover, waiting to receive notification of a failure until after a customer has attempted to use the circuit may also result in additional expenses for the circuit provider. For instance, if a warranty was provided to the customer when the circuit was installed, the circuit provider may have to supply the customer with a payment associated with the warranty because of the failure. However, if the failure had been detected prior to use by the customer, then frustration, loss of goodwill, and additional costs would likely be avoided.

It is with respect to these considerations and others that aspects of a method, system, and computer-readable medium for testing failure rate of newly installed network elements within a predetermined amount of time prior to customer use of the network elements are described below.

SUMMARY OF THE INVENTION

In accordance with the present invention, the above and other problems are solved by providing methods, systems, and computer-readable media for testing failure rate of newly installed network elements within a predetermined amount of time prior to customer use of the network elements. According to one aspect of the present invention, a method is provided for testing network elements. The method involves accessing an orders report including information regarding one or more network elements and determining, based on the information provided by the orders report, a network element from the one or more network elements to be tested. Information regarding the network element to be tested is retrieved from the orders report and included on a ticket created for the network element to be tested. The ticket created for the network element is then forwarded to a test device for testing of the network element associated with the forwarded ticket.

According to another aspect of the present invention, a method is provided for testing network elements by receiving a ticket including information regarding a network element to be tested. A determination is made whether the network element associated with the ticket is being used by a customer. In an embodiment of the present invention, determining if the network element is being used by a customer includes determining if an alarm is received from the network element. If an alarm is received, then the network element is not being used by a customer. If an alarm is not received from the network element, then the network element is being used by a customer. If the network element is not being used by a customer, then the network element is tested for a failure. If the network element is being used by a customer, then the ticket associated with the network element is closed such that testing of the network element is terminated.

According to yet another aspect of the present invention, a system is provided for testing network elements. The system includes a control device that retrieves information from an orders report regarding a network element to be tested and creates a ticket for the network element including information retrieved from the orders report. The ticket is then forwarded by the control device to a test device for testing the network element associated with the forwarded ticket. The test device receives the ticket from the control device and determines whether the network element associated with the ticket is being used by a customer. If the network element is not being used by a customer, then the network element is tested by the test device for a failure. The ticket is then associated with an indication representing test results for the tested network element and forwarded to the control device. If the test device determines that the network element associated with the ticket is being used by a customer, then the ticket is associated with an indication that the network element is being used by a customer and forwarded to the control device.

The subject matter described herein may also be implemented as an apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages will be apparent from a reading of the following detailed description and a review of the associated drawings.

DETAILED DESCRIPTION OF THE INVENTION

Figure 1:
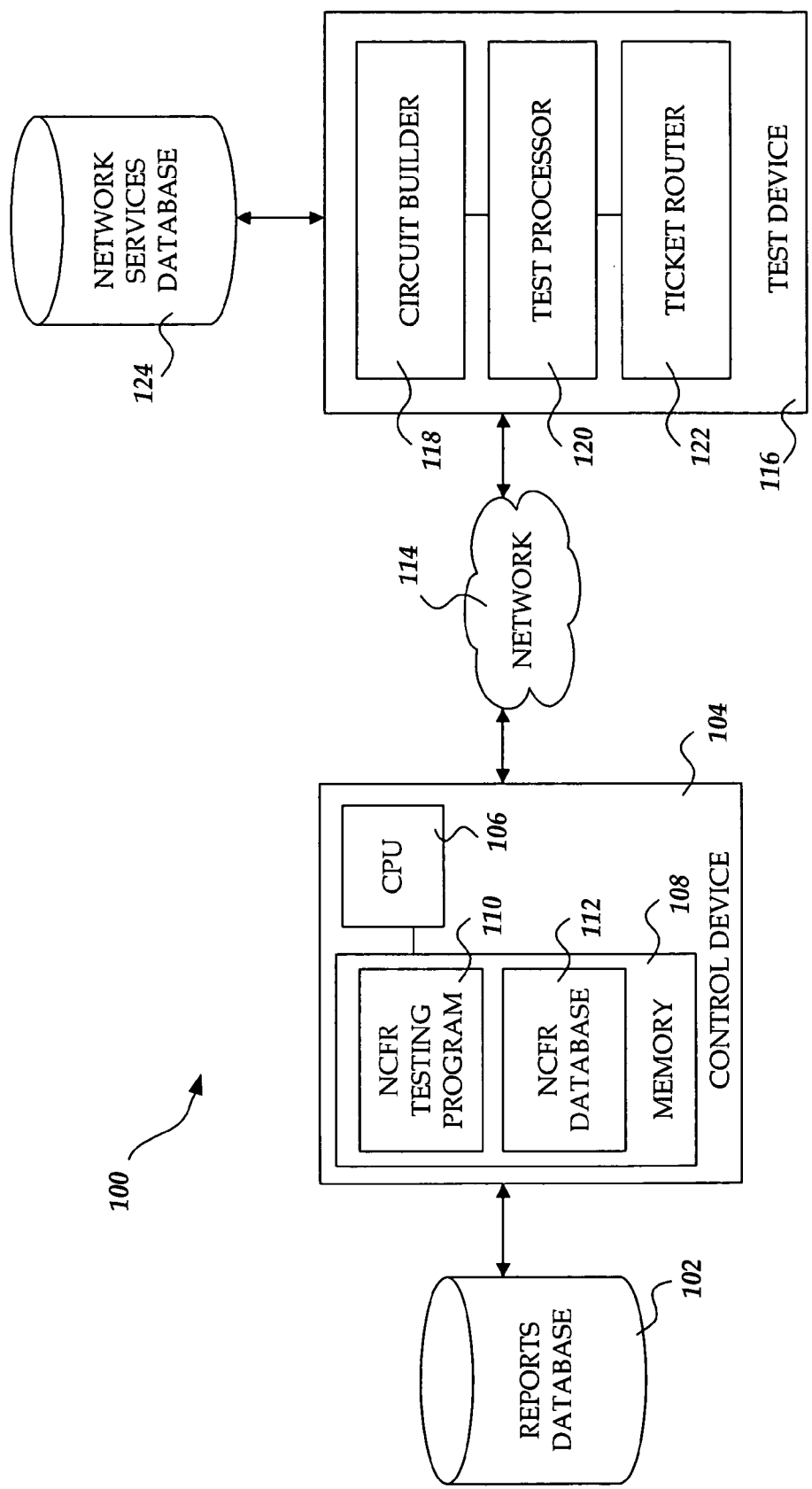
FIG. 1 illustrates a network operating environment utilized in various embodiments of the present invention.

Embodiments of the present invention provide methods, systems, apparatus, and computer-readable media for testing failure rate of newly installed network elements within a predetermined amount of time prior to customer use of the network elements. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Referring now to FIG. 1, an illustrative operating environment 100 for practicing the various embodiments of the invention will now be described. FIG. 1 shows a control device 104 for preparing and providing information regarding network elements, such as circuits, newly installed in a communication network so that the network elements may be tested prior to being used by a customer. Although the description provided herein refers to preparing and providing information regarding newly installed circuits and testing the newly installed circuits, it should be appreciated that the various embodiments of the present invention may be used to prepare and provide information as well as test any element associated with a communication network.

As shown in FIG. 1, the operating environment 100 includes a control device 104 for preparing and providing information regarding circuits to be tested. In an embodiment of the present invention, the control device 104 may comprise a computing device, such as a WORK AND FORCE ADMINISTRATION/CONTROL System ("WFA/C") from TELCORDIA of New Jersey, capable of executing one or more application programs. The control device 104 may include a processor 106 for controlling the operation of the control device. The processor 106 may comprise a general purpose central processing unit ("CPU"), a more specific purpose programmable logic controller ("PLC"), a programmable gate array, or other type of processor known to those skilled in the art and suitable for controlling the operation of the control device 104.

The processor 106 is connected to a memory 108. The memory 108 may comprise a volatile or non-volatile memory that includes program code executed by the processor 106 for controlling the operation of the control device 104. In particular, as will be discussed in greater detail below, the memory 108 may include a New Circuit Failure Rate ("NCFR") testing program 110 which, when executed by the processor 106 of the control device 104, prepares and provides information regarding newly installed circuits so that the circuits may be tested prior to being used by a customer. It should be understood by those skilled in the art that the NCFR testing program 110 may be stored on a computing device separate from, but communicatively connected to, the control device such that the control device may receive instructions from the NCFR testing program regarding preparing information regarding newly installed circuits and testing the circuits. For example, a computing device including the NCFR testing program 110 may be communicatively connected to the control device 104 through a wired or wireless network or any other type of connection allowing transmission of data between the computing device and the control device.

The memory 108 may also include a NCFR database 112 for storing information regarding the newly installed circuits while the circuits are waiting to be further tested, as will be discussed in greater detail below. It should be understood by those skilled in the art that the NCFR database 112 may be stored along with the NCFR testing program 110 on a computing device that is separate from, but communicatively connected to, the control device 104 such that the control device may retrieve information from and store information in the NCFR database regarding newly installed circuits. It should further be understood that the NCFR database may be stored in a computing device that is separate from, but communicatively connected to, both the NCFR testing program 110 as well as the control device 104.

As illustrated by FIG. 1, the control device 104 is connected to a reports database 102 for storing Orders Completed Yesterday ("OCY") reports. In an embodiment of the present invention, an OCY report includes information about network elements, such as circuits, that have been provided to the customer and activated on the previous day. After an OCY report is created, the control device 104, under the instruction of the NCFR testing program 110, may retrieve the report from the reports database 102 and utilize information regarding newly installed circuits from the report to create an information ticket for each of the newly installed circuits, as will be discussed in greater detail in view of FIG. 2. In another embodiment of the present invention, the OCY report may be transmitted to the control device 104 by the reports database 102 once the OCY report has been created. Once the information ticket regarding a newly installed circuit is created, the control device 104 may immediately transmit the ticket to a test device 116 for testing of the circuit. It should be appreciated that the operating environment 100 shown in FIG. 1 is merely illustrative and that other environments may be utilized.

It should be understood by those skilled in the art that the reports database 102 may reside on a computing device (not shown) located external to the control device 104. The reports database 102 may be connected to the control device 104 via any type of communication network including a wired network such as, for example, a wired Wide Area Network (WAN), a wired (Local Area Network) LAN such as the Ethernet, a wired Personal Area Network (PAN), or a wired Metropolitan Area Network (MAN). Moreover, the database 102 may be connected to the control device 104 via a wireless network such as, for example, a Wireless Local Area Network (WLAN) such as a WI-FI network, a Wireless Wide Area Network (WWAN), a Wireless Personal Area Network (WPAN) such as BLUETOOTH, or a Wireless Metropolitan Area Network (WMAN) such as a Worldwide Interoperability for Microwave Access (WiMax) network. It should also be appreciated by those skilled in the art that the reports database 102 may be stored within the memory 108 of the control device 104.

As noted above, for testing the newly installed circuits, the control device 104 is connected to the test device 116 through a network 114. In an embodiment of the present invention, the test device 116 is an Integrated Testing and Analysis System ("INTAS"). The network 114 may be a wired network such as, but not limited to, a WAN, LAN, PAN, or MAN; or a wireless network such as, but not limited to, a WWAN, a WPAN, or a WMAN. Both the control device 104 and the test device 116 may include network interface units (not shown) for connecting to the network 114 as well as other types of networks and remote computing systems.

In an embodiment of the present invention, the test device 116 includes a circuit builder 118, a test processor 120, and a ticket router 122. As discussed above, once the control device 104 creates an information ticket including information about a newly installed circuit, the control device transmits the ticket to the test device 116 via the network 114. Once the ticket is received by the test device 116, the circuit builder 118 uses information about the newly installed circuit from the ticket to access further details about the circuit stored within a Network Services Database ("NSD") 124. The NSD includes detailed information about the newly installed circuit associated with the information ticket received by the test device 116 which may be used by the circuit builder 118 to construct a model of the circuit. The model of the circuit may be used during testing of the circuit to help determine what is being tested and where, if any, a failure in the circuit has occurred.

Once the circuit builder 118 has created and stored a model of the circuit associated with the received information ticket, the ticket is accessed by the test processor 120. In an embodiment of the present invention, the test processor 120 non-intrusively examines the circuit associated with the received information ticket to determine whether the circuit is issuing an alarm. Presence of an alarm from the circuit indicates either that no voice or data has been transmitted over the circuit (e.g., a customer has not used the circuit) or that the circuit has failed. Absence of an alarm from the circuit indicates that a customer has already begun using the circuit. If the test processor 120 receives an alarm from the circuit associated with the received ticket, then the test processor tests the circuit. The test processor 120 may conduct a number of tests on the circuit including, but not limited to, a connectivity test to determine whether the circuit has connectivity from the start of the circuit to the end of the circuit and a Bit Error Rate Test ("BERT") to determine whether the circuit is associated with any bit errors.

If a failure is detected by the test processor 120 during testing, the test processor associates the received information ticket associated with the failed circuit with an indicator, such as a test code, representing that the circuit was tested and that a failure was detected. On the other hand, if a failure is not detected, the test processor 120 associates the received information ticket associated with the circuit with a test code representing that the circuit was tested and that a failure was not detected. Once the received information ticket is associated with a test code, the information ticket is accessed by the ticket router 122 which transmits the information ticket through the network 114 back to the control device 104.

If, while examining the circuit associated with the received information ticket, the test processor 120 does not receive an alarm from the circuit, the test processor associates the information ticket with an indicator, such as a test code, representing that the circuit is already being used by a customer. The information ticket is then accessed by the ticket router 122 which transmits the information ticket through the network 114 back to the control device 104.

Upon receipt of the information ticket, the control device 104 may examine the test code associated with the information ticket to determine how to further handle the information ticket. In an embodiment of the present invention, if the control device 104 determines that the test code of the information ticket indicates that the circuit associated with the information ticket was tested and a failure was detected, then the control device may route the ticket to a location capable of resolving the failure. In another embodiment of the present invention, if the control device 104 determines from the test indicator that the circuit associated with the information ticket has failed, then the control device may automatically cause a dispatch of a technician to resolve the failure. Otherwise, if the control device 104 determines that the test code of the information ticket does not indicate that the circuit failed, then the control device may store the information ticket in the NCFR database 112.

After the information ticket has been stored in the NCFR database 112 for a predetermined amount of time, the control device 104 may further examine the test code associated with the information ticket to determine whether the test code indicates that the circuit is already being used by a customer or that the circuit was tested and did not fail. In an embodiment of the present invention, the predetermined amount of time may be twenty four hours so that the newly installed circuits are tested daily. It should be understood by those skilled in the art that any amount of time may be selected for the predetermined amount of time. If the control device 104 determines that the circuit is already being used by a customer, then the control device may remove the information ticket from the NCFR database 112 and close the ticket so that retesting of the circuit is not performed.

In an embodiment of the present invention, if the control device 104 determines from the test code associated with the information ticket that the circuit was tested and did not fail, the control device may further determine how long the circuit has been activated based on data from the information ticket. If the circuit has been activated for an amount of time less than a predetermined amount of active time, then the control device 104 may transmit the information ticket to the test device 116 through the network 114 for retesting. In an embodiment of the present invention, the control device 104, under the instruction of the NCFR testing program 110, may instruct the NCFR database 112 to transmit the information ticket to the test device 116 by issuing an autotest ("AT") command. On the other hand, if the circuit has been activated for an amount of time equal to or greater than the predetermined amount of active time, then the control device 104 may remove the information ticket from the NCFR database 112 and close the information ticket so that retesting of the circuit is not performed. In an embodiment of the present invention, the predetermined amount of active time may be thirty days.

Figure 2:
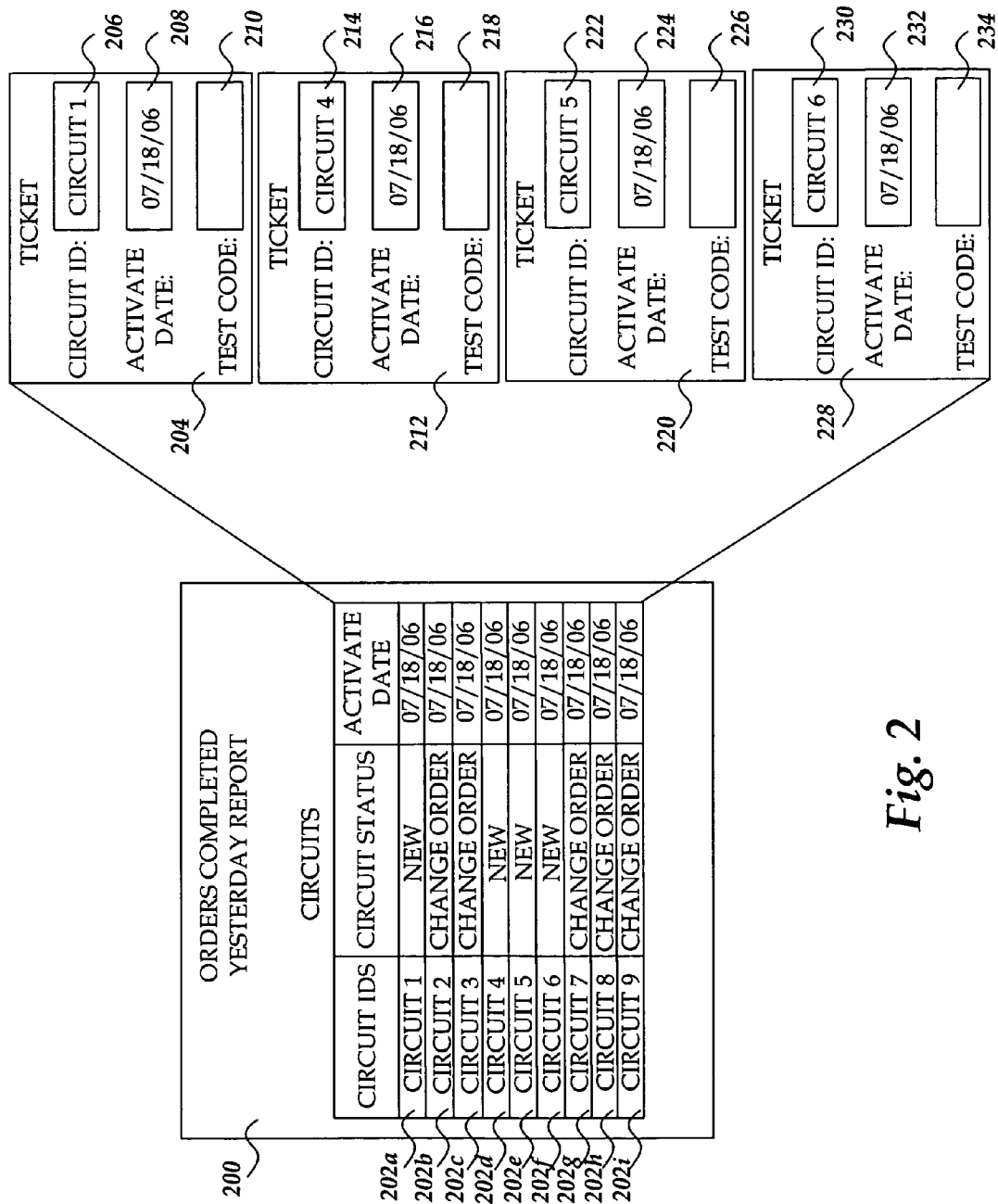
FIG. 2 illustrates an order report and tickets generated from information provided by the order report based on various embodiments of the present invention.

Turning now to FIG. 2, additional details regarding the creation of exemplary information tickets 204, 212, 220, and 228 for newly installed circuits based on information from an OCY report 200 will be described. As discussed above, the OCY report 200 may include information concerning any type of network element that was installed and activated on a day previous to when the report is generated. For example, as illustrated in FIG. 2, the OCY report 200 generated on July 19 includes entries 202*a*-202*i* providing information about circuits installed and activated on July 18. It should be understood by those skilled in the art that the report 200 may include information about newly installed network elements generated on the same day the elements were installed and activated or on any day after the installation and activation of the elements. Therefore, the report 200 may include network elements that were installed and activated on the same day as the report was generated or any day after the installation and activation of the elements.

The information provided by the OCY report 200 may include the entries 202*a*-202*i* identifying the type of network element that was installed, a status associated with the network element, and an activate date corresponding to the date when the network element was activated. As illustrated in FIG. 2, the identification information provided by the OCY report 200 indicates that the network elements installed and activated were circuits. In an embodiment of the present invention, the circuits may include T1 circuits and Digital Data System ("DDS") circuits. It should be appreciated by those skilled in the art that circuits included on an OCY report may include any other type of network circuit capable of providing communications between two or more points.

The status information provided by the OCY report 200 indicates whether the installation of a network element was a new installation or a change order installation. A new installation status associated with network elements, such as the circuits included in the entries 202*a* and 202*d*-202*f*, indicates that the elements are installed due to a new order for the elements. A change order status associated with network elements, such as the circuits included in the entries 202*b*-202*c* and 202*g*-202*i*, indicates that the elements were installed due to a change in location of a customer instead of a new order. It should be appreciated that the OCY report 200 may also include a variety of further information associated with an installed and activated network element. It should further be appreciated that the arrangement of information associated with the OCY report 200, as illustrated in FIG. 2, is provided for illustration purposes only and that a variety of alternative arrangements may be utilized to present the information provided by the OCY report.

As discussed above, once the OCY report 200 is generated, the control device 104 may retrieve and use the information regarding newly installed network elements from the OCY report to generate information tickets, such as information tickets 204, 212, 220, and 228, which are used by the control device and the test device 116 to test the network elements before the elements are used by a customer. To generate the information tickets, the control device 104 utilizes criteria specified by the NCFR test program 110 to determine which network elements from the OCY report 200 to generate an information ticket. In an embodiment of the present invention, the criteria provided by the NCFR test program 110 may instruct the control device 104 to create information tickets only for those network elements associated with a new installation status. As illustrated by FIG. 2, the control device 104 uses the criteria specified by the NCFR test program 110 to find the circuits included in the entries 202a, 202d, 202e, and 202f associated with a new installation status and generate the information tickets 204, 212, 220, and 228, respectively, for the circuits. It should be appreciated that the criteria may instruct the control device 104 to generate information tickets for a variety of different groups of network elements provided on the OCY report 200 and that the criteria may be changed depending on which network elements should be tested prior to use by a customer.

When generating an information ticket, the control device 104 includes a variety of information from the OCY report 200 on the ticket regarding the circuit for which the ticket was generated. For example, with regard to the information ticket 204 generated based on information provided by the entry 202a of the OCY report 200, the information ticket may include an identification field 206 for receiving identification information about the particular circuit, in this case Circuit 1, for which the information ticket was generated and an activate date field 208 for receiving the date on which Circuit 1 was activated, which in this case was Jul. 18, 2006. In an embodiment of the present invention, the control device 104 may complete the identification field 206 and the activate data field 208 by locating the identification information and the activate date information, respectively, on the OCY report 200 and emulating the information on the information ticket. It should be appreciated that the information ticket 204 may include any other information provided by the OCY report 200 or other reports retrievable by the control device 104.

The information provided by the identification field 206 may be used by the circuit builder 118 of the test device 116 to identify the circuit associated with the information ticket 204 and to retrieve further information about the identified circuit from the NSD 124. Moreover, the test processor 120 may also use the information provided by the identification field 206 to identify which circuit to examine and, if necessary, test. The information provided by the activate date field 208 may be utilized by the control device 104 to determine whether the circuit associated with the information ticket 204 has been activated for an amount of time less than a predetermined amount of active time by comparing the information from the activate date field 208 with the predetermined amount of active time.

As illustrated in FIG. 2, the information ticket 204 may also include a test code field 210 for receiving a test code assigned to Circuit 1 by the test device 116 during testing of the circuit. As discussed above, an information ticket may be assigned a test code by the test device 116 indicating that the circuit associated with the information ticket is already being used by a customer, was tested and a failure was detected, or was tested and a failure was not detected. The information provided by the test code field 210 may be utilized by the control device 104 to determine whether the information ticket 204 should be closed, routed to another location capable of resolving the circuit failure, or transmitted to the test device 116 for further testing of the circuit. It should be appreciated by those skilled in the art that the test code of the test code field 210 may be updated and changed as the circuit associated with the information ticket is reexamined and retested by the test device 116.

Figure 3A:
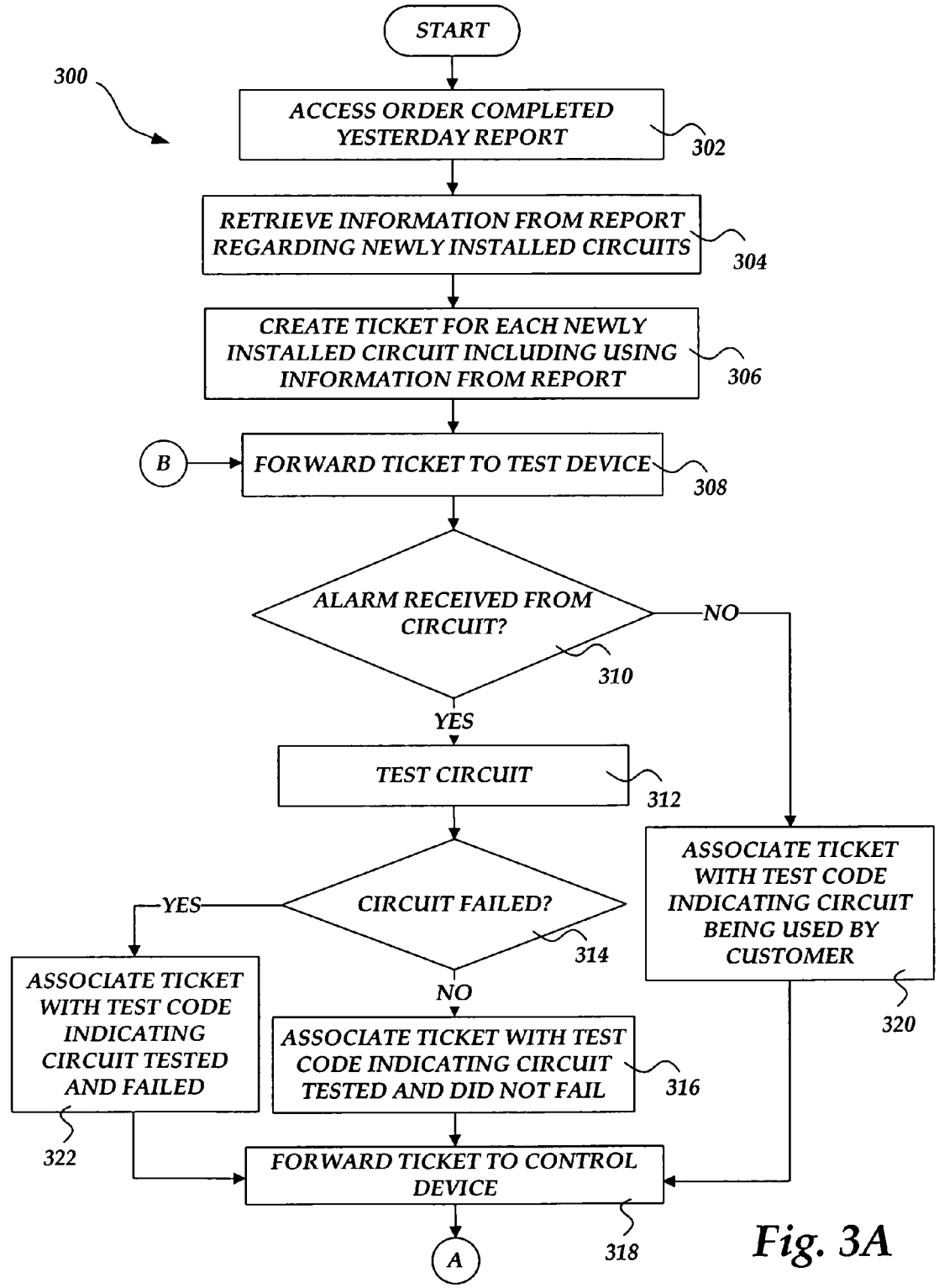
FIGS. 3A-3B are flow diagrams illustrating aspects of a process for testing failure rate of newly installed circuits within a predetermined amount of time prior to customer use of the circuits based on various embodiments of the present invention.
Figure 3B:
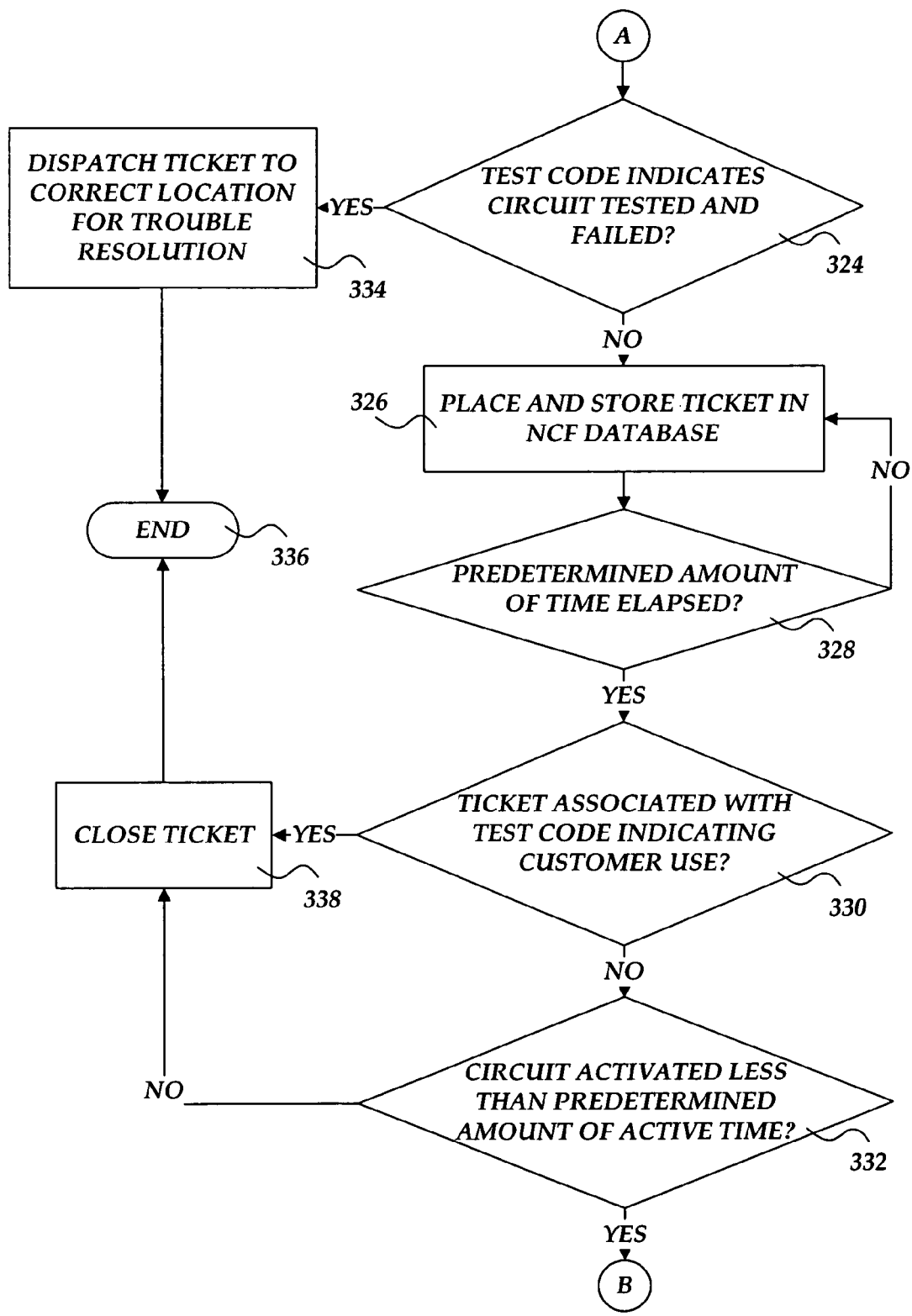

Referring now to FIGS. 3A-3B, additional details regarding the operation of the control device 104 and the test device 116 will be described. In particular, FIGS. 3A-3B illustrate a routine 300 for identifying circuits newly installed in a communication network and for testing the newly installed circuits to detect and resolve circuit failures prior to use by a customer. The routine 300 begins at operation 302, where an OCY report, such as the OCY report 200, including information about network elements installed and activated the previous day is accessed from the reports database 102. As discussed above, when an OCY report is created, the control device 104 may retrieve the report from the reports database 102, or the reports database may transmit the report to the control device. From operation 302, the routine 300 proceeds to operation 304, where the control device 104 uses criteria specified by the NCFR test program 110 to locate information on the OCY report concerning newly installed circuits. In an embodiment of the present invention, if the OCY report does not include information about any circuits that match the criteria provided by the NCFR test program 110, the control device 104 may discard the current OCY report and access the next OCY report once the report is generated.

From operation 304, the routine 300 proceeds to operation 306, where the control device 104, under the instructions of the NCFR test program 110, emulates the information about newly installed circuits provided by the OCY report to create an information ticket for each of the newly installed circuits. As discussed above, an information ticket, such as the information ticket 204, may include an identification field 206 for receiving information identifying the particular circuit for which the ticket was generated, an activate date field 208 for receiving the date on which the circuit was activated, and a test code field 210 for receiving information indicating whether the circuit is being used by customer, was tested and failed, or was tested and did not fail. Once an information ticket associated with a newly installed circuits is created, the routine 300 proceeds to operation 308, where the information ticket is transmitted to the test device 116.

Once the information ticket is received by the test device 116, the routine 300 proceeds to operation 310, where a determination is made whether an alarm is received from the circuit associated with the information ticket. As noted above, presence of an alarm from the circuit indicates either that no voice or data has been transmitted over the circuit (e.g., a customer has not used the circuit) or that the circuit has failed, and absence of an alarm from the circuit indicates that a customer has already begun using the circuit. If, at operation 310, a determination is made that an alarm is not received from the circuit associated with the information ticket, then the routine 300 proceeds to operation 320 where the information ticket is associated with a test code indicating that the circuit is already being used by a customer. As discussed above, the test code may be inserted in the test code field of the information ticket. From operation 320, the routine 300 proceeds to operation 318, where the information ticket is transmitted back to the control device 104.

On the other hand, if an alarm is received from the circuit associated with the information ticket at operation 310, then the routine 300 proceeds to operation 312, where the circuit is tested to determine if a failure exists. In an embodiment of the present invention, the test processor 120 of the test device 116 may conduct a connectivity test and a BERT on the circuit. The routine 300 then proceeds to operation 314, where a determination is made whether the circuit failed when tested. If the circuit associated with the information did fail when tested, then the routine 300 proceeds from operation 314 to operation 322, where the information ticket is associated with a test code indicating that the circuit was tested and failed. From operation 322, the routine 300 proceeds to operation 318, where the information ticket is transmitted back to the control device 104.

If, back at operation 314, a determination is made that the circuit associated with the information did not fail when tested, then the routine 300 proceeds to operation 316, where the information ticket is associated with a test code indicating that the circuit was tested and did not fail. From operation 316, the routine 300 proceeds to operation 318, where the information ticket is transmitted back to the control device 104.

From operation 318, the routine 300 proceeds to operation 324, where the control device 104 examines the test code inserted in the test code field of the information ticket received from the test device 116 to determine whether the circuit associated with the information ticket was tested and failed. If the control device 104 determines that the circuit was tested and that a failure was detected, then the routine 300 proceeds to operation 334, where the ticket is dispatched to a location capable of resolving the failure. From operation 334, the routine 300 proceeds to operation 336, where it ends.

If, back at operation 324, the test code indicates that the circuit associated with the information ticket received from the test device 116 was tested and a failure was not detected, then the routine 300 proceeds to operation 326, where the information ticket is stored in the NCFR database 112 of the control device 104. From operation 326, the routine 300 proceeds to operation 328, where a determination is made whether a predetermined amount of time has elapsed since the information ticket was stored in the NCFR database 112. As discussed above, the predetermined amount of time may be twenty four hours so that circuits associated with information tickets stored in the NCFR database 112 may be tested daily, if necessary. If a determination is made that the predetermined amount of time has not elapsed, then the routine 300 proceeds back to operation 326, where the information ticket continues to be stored in the NCFR database 112. On the other hand, if a determination is made that the predetermined amount of time has elapsed, then the routine 300 proceeds to operation 330.

At operation 330, the control device 104 examines the test code inserted in the test code field of the information ticket stored in the NCFR database 112 to determine whether the circuit associated with the information ticket is already being used by a customer. If the test code indicates that the circuit is already being used by a customer, then the routine 300 proceeds to operation 338, where the information ticket is closed so that retesting of the circuit is terminated. From operation 338, the routine 300 proceeds to operation 336, where it ends.

If, back at operation 330, the control device 104 determines based on the test code of the information ticket that the circuit associated with the information ticket stored in the NCFR database 112 was tested and a failure was not detected, then the routine 300 proceeds to operation 332, where a further determination is made whether the circuit has been activated for an amount of time less than a predetermined amount of active time. As discussed above, the control device 104 may compare the predetermined amount of active time with the date inserted in the active date field of the information ticket to determine whether the circuit associated with the ticket has been activated for an amount of time less than the predetermined amount of active time. If the circuit has been activated for an amount of time equal to or greater than the predetermined amount of active time, then the routine 300 proceeds from operation 332 to operation 338, where the information ticket is closed so that retesting of the circuit is terminated. From operation 338, the routine 300 proceeds to operation 336, where it ends.

If, back at operation 332, a determination is made that the circuit has been activated for an amount of time less than the predetermined amount of active time, then the routine 300 proceeds back to operation 308. At operation 308, the information ticket is again forwarded to the test device 308 for testing of the circuit associated with the information ticket. The circuit associated with the information ticket will continue to be tested until either a customer begins using the circuit, a failure is detected during testing of the circuit, or the circuit is activated for an amount of time equal to or greater than the predetermined amount of active time.

It will be appreciated that embodiments of the present invention provide methods, systems, apparatus, and computer-readable media for testing failure rate of newly installed network elements within a predetermined amount of time prior to customer use of the circuits. Although the invention has been described in language specific to computer structural features, methodological acts, and by computer readable media, it is to be understood that the invention defined in the appended claims is not necessarily limited to the specific structures, acts, or media described. Therefore, the specific structural features, acts, and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for testing network elements, comprising:
accessing an orders report including information regarding the network elements;
determining, based on the information provided by the orders report, a network element from the network elements to be tested;
retrieving information from the orders report regarding the network element to be tested;
creating a ticket for the network element to be tested including the information retrieved from the orders report;
forwarding the ticket to a test device for testing the network element associated with the forwarded ticket;
receiving the ticket from the test device;
determining whether testing of the network element associated with the ticket received resulted in a failure;
if testing of the network element associated with the ticket received resulted in the failure, then scheduling repair of the network element and closing the ticket so that testing of the network element associated with the ticket is terminated; and if testing of the network element associated with the ticket received did not result in the failure, then after a first predetermined amount of time, determining whether the ticket should be forwarded to the test device for retesting of the network element associated with the ticket.

2. The method of claim 1, wherein determining whether testing of the network element associated with the ticket received resulted in a failure includes reviewing a test code associated with the ticket received to determine if the test code indicates that testing of the network element associated with the ticket received resulted in the failure.

3. The method of claim 1, wherein determining whether the ticket should be forwarded to the test device for retesting the network element associated with the ticket comprises:

after the first predetermined amount of time, determining whether the network element associated with the ticket is being used by a customer;

if the network element associated with the ticket is being used by the customer, then closing the ticket associated with the network element;

if the network element associated with the ticket is not being used by the customer, then determining whether the network element associated with the ticket has been active for an amount of time less than a second predetermined amount of time;

if the network element associated with the ticket has not been active for the amount of time less than the second predetermined amount of time, then closing the ticket associated with the network element; and if the network element associated with the ticket has been active for the amount of time less than the second predetermined amount of time, then forwarding the ticket to the test device for retesting of the network element associated with the ticket.

4. The method of claim 3, wherein determining whether the network element associated with the ticket is being used by a customer includes reviewing a test code associated with the ticket to determine if the test code indicates that the network element is being used by the customer.

5. The method of claim 3, wherein determining whether the network element associated with the ticket has been active for an amount of time less than the first predetermined amount of time includes:

retrieving information from the ticket regarding a time when the network element associated with the ticket was activated; and comparing the time when the network element was activated with the first predetermined amount of time.

6. The method of claim 1, wherein determining, based on the information provided by the orders report, a network element from the network elements to be tested comprises determining, based on an installation status provided by the orders report, the network element from the network elements that is a newly installed network element.

7. A system for testing network elements, comprising:

a control device operative to:
retrieve information from an orders report regarding a network element to be tested,
create a ticket for the network element to be tested including information retrieved from the orders report, and
forward the ticket to a test device for testing the network element associated with the forwarded ticket; and the test device connected to the control device, the test device operative to:
receive the ticket from the control device including the information regarding the network element to be tested,
determine whether the network element associated with the ticket is being used by a customer,
if the network element associated with the ticket is not being used by the customer, then test the network element for a failure,
associate the ticket with an indication representing test results for the network element, and
forward the ticket associated with the network element to the control device, and
if the network element associated with the ticket is being used by the customer, then:
associate the ticket with an indication that the network element is being used by the customer, and
forward the ticket associated with the network element to the control device.

8. The system of claim 7, wherein the control device is further operative to:

receive the ticket associated with the network element from the test device;

determine whether the ticket indicates that testing of the network element resulted in the failure;

if the ticket indicates that testing of the network element associated with the ticket resulted in the failure, then schedule a repair of the network element and close the ticket so that testing of the network element is terminated;

if the ticket indicates that the network element is being used by the customer, then store the ticket for a first predetermined amount of time; and if the ticket indicates that testing of the network element associated with the ticket did not result in the failure, then store the ticket for the first predetermined amount of time.

9. The system of claim 8, wherein the control device is further operative to:

if the ticket stored indicates that the network element associated with the stored ticket is being used by the customer, then close the ticket stored so that testing of the network element is terminated;

if the ticket stored indicates that testing of the network element associated with the stored ticket did not result in the failure, then determine whether the network element has been active for an amount of time less than a second predetermined amount of time;

if the network element associated with the ticket stored has not been active for the amount of time less than the second predetermined amount of time, then close the ticket stored so that testing of the network element is terminated; and if the network element associated with the ticket stored has been active for the amount of time less than the second predetermined amount of time, then forward the ticket stored to the test device for retesting of the network element associated with the ticket stored.

10. The system of claim 7, wherein determining whether a network element is being used by a customer includes:

determining whether an alarm is received from the network element;

if the alarm is received from the network element, then determining that the network element is not being used by the customer; and if the alarm is not received from the network element, then determining that the network element is being used by the customer.

11. The system of claim 7, wherein the network elements to be tested include newly installed network elements from the orders report.

12. The system of claim 7, wherein testing the network element for a failure includes conducting a continuity test and a bit rate error test on the network element.

* * * * *